United States Patent
Blanchet et al.

(10) Patent No.: US 7,305,481 B2
(45) Date of Patent: Dec. 4, 2007

(54) CONNECTING IPV6 DEVICES THROUGH IPV4 NETWORK AND NETWORK ADDRESS TRANSLATOR (NAT) USING TUNNEL SETUP PROTOCOL

(75) Inventors: Marc Blanchet, St-Augustin (CA); Florent Parent, Cap-Rouge (CA); Jean-Francois Boudreault, Ste-Foy (CA)

(73) Assignee: Hexago Inc., Montreal (CA)

(*) Notice: Subject to any disclaimer, the term of this patent is extended or adjusted under 35 U.S.C. 154(b) by 912 days.

(21) Appl. No.: 10/337,428

(22) Filed: Jan. 7, 2003

(65) Prior Publication Data
US 2004/0133692 A1 Jul. 8, 2004

(51) Int. Cl.
*G06F 15/16* (2006.01)
*H04L 12/28* (2006.01)

(52) U.S. Cl. ............ 709/230; 709/227; 709/203; 370/389

(58) Field of Classification Search ........ 709/248–253, 709/200–203, 217–229, 230, 231, 232, 238; 370/389; 711/202, 206; 719/310, 311, 313, 719/317, 318
See application file for complete search history.

(56) References Cited

U.S. PATENT DOCUMENTS

| | | | |
|---|---|---|---|
| 6,580,717 B1* | 6/2003 | Higuchi et al. | 370/401 |
| 6,981,278 B1* | 12/2005 | Minnig et al. | 726/12 |
| 7,028,335 B1* | 4/2006 | Borella et al. | 726/11 |
| 7,032,242 B1* | 4/2006 | Grabelsky et al. | 726/11 |
| 7,036,143 B1* | 4/2006 | Leung et al. | 726/15 |
| 7,079,520 B2* | 7/2006 | Feige et al. | 370/338 |
| 2001/0040895 A1* | 11/2001 | Templin | 370/466 |
| 2003/0088702 A1 | 5/2003 | Iwata et al. | 709/245 |
| 2003/0225911 A1 | 12/2003 | Lee et al. | 709/245 |
| 2004/0013130 A1* | 1/2004 | Blanchet et al. | 370/466 |
| 2004/0052257 A1* | 3/2004 | Abdo et al. | 370/392 |
| 2004/0093434 A1* | 5/2004 | Hovell et al. | 709/249 |
| 2004/0100953 A1* | 5/2004 | Chen et al. | 370/389 |
| 2005/0223095 A1* | 10/2005 | Volz et al. | 709/225 |

FOREIGN PATENT DOCUMENTS

| | | |
|---|---|---|
| WO | WO 03/041365 | 5/2003 |
| WO | WO 03/084184 | 10/2003 |
| WO | WO 03/084185 | 10/2003 |

OTHER PUBLICATIONS

"IPv6 over IPv4 profile for Tunnel Setup Protocol (TSP)", M. Blanchet, et. al., pp. 1-13, Jul. 13, 2001.*
"An overview of the introduction of IPv6 in the Internet", W. Biemolt, et al., pp. 1-28, Feb. 2002.*
"Tunnel Setup Protocol" www.chone.net/ngtrans/ietf-51-london/tsp.ppt, Aug. 10, 2001, Marc Blanchet et al.*
"Tunnel Setup Protocol" www.ietf.org/procedings/99nov/ngtrans-blancket-tunnel-setup/tsldool.htm, Marc Blanchet, Nov. 1999.*

* cited by examiner

*Primary Examiner*—Haresh Patel
(74) *Attorney, Agent, or Firm*—Kent Daniels; Ogilvy Renault LLP

(57) ABSTRACT

A tunnel setup protocol enables tunnel clients to set up IPv6-in-IPv4 networks to permit IPv6 nodes to communicate across the IPv4 network using IPv6 native packets, even if the IPv4 network contains a Network Address Translation function. The tunnel setup protocol uses a control channel to negotiate tunnel configuration parameters and exchange tunnel configuration data between a tunnel client and a tunnel broker server. The tunnel setup is automatic, and migration to IPv6 is ameliorated.

28 Claims, 8 Drawing Sheets

CONNECTING IPV6 DEVICES THROUGH IPV4 NETWORK AND NETWORK ADDRESS TRANSLATOR (NAT) USING TUNNEL SETUP PROTOCOL

CROSS-REFERENCE TO RELATED APPLICATIONS

This is the first application filed for the present invention.

MICROFICHE APPENDIX

Not Applicable.

TECHNICAL FIELD

The invention relates in general to the transition of Internet Protocol (IP) networks from IP version 4 (IPv4) to IP version 6 (IPv6) and, in particular, to a method and apparatus for connecting IPv6 devices through an IPv4 network with network address translation (NAT) using a tunnel setup protocol.

BACKGROUND OF THE INVENTION

Internet Protocol (IP) was created in the 1960's by the United States Advanced Research Projects Agency (ARPA). The Agency's mission was to create instruments useful for military purposes, in particular communications and decentralized computer networks. The original idea was to create connections between military bases using a decentralized communications network with a mesh structure that would permit network function despite significant damage to the country's infrastructure sustained in a military attack. In the early years of its development, the Internet was used for data transfers, principally as file transfer protocol (FTP) sessions.

Use of the Internet spread from the military to the scientific and educational communities in the 1970's and 80's. Propagation of the Internet was, however, slow until the Worldwide Web (WWW) was created. The Worldwide Web was first intended to provide a convenient channel for the transfer of scientific information. However, it caught the attention of the commercial world and in the 1990's an explosive growth of the expansion of the Internet ensued. That explosive growth continues today. The current Internet uses an Internet Protocol referred to as IP version 4 (IPv4). IPv4 uses address fields that are 32 bits long. Although the potential number of IP addresses is $2^{32}$, over 70% of those addresses have already been assigned and, if as expected the explosive growth of the Internet continues at its current pace, total exhaustion of IPv4 addresses will occur by 2006. Consequently, the Internet Engineering Task Force (IETF) has developed a new Internet standard referred to as IPv6 which uses 128-bit addressing. The address space in IPv6 is intended to accommodate connection of substantially any intelligent electronic device to the IP network. This includes mobile devices.

It is well known that IPv4 and IPv6 are not compatible because of the differences in address space. Consequently, IPv4 and IPv6 networks can only be interconnected by gateway nodes provisioned with both IPv4 and IPv6 network stacks. However, because of the current lack of available IPv4 address space, IPv6 networks are being deployed and connected to the IPv4 network. A need has therefore arisen for equipment and methods to permit IPv6 devices to communicate across the IPv4 network in order to enhance IPv6 device interconnectivity. This need has been partially met by an invention described in Applicant's U.S. patent application Ser. No. 10/195,396, now copending, which was filed on Jul. 16, 2002 and describes a method and apparatus for connecting IPv6 devices through an IPv4 network using a tunnel setup protocol, the specification of which is incorporated herein by reference.

While Applicant's invention for providing IPv6 connectivity over an IPv4 network using a tunnel setup protocol represents a significant advance, it is not adapted to accommodate connectivity across all network configurations found in the IPv4 network. One significant problem remains to be addressed. The problem is associated with network address translation (NAT). NAT is used as a an alternative to having a global IPv4 address for each device having access to the Internet. When a local area network (LAN) is connected to the Internet, NAT is generally used at the gateway to the Internet so that each computer in the LAN does not require a globally unique IPv4 address. This permits a private addressing scheme to be used in the LAN, because all traffic to and from the Internet goes through a single external host, which is generally a router.

NAT is frequently built into routers and firewalls. As used in this document, the word "router" means any router, firewall or other gateway configured to relay packets in a data packet network. The routers receive each packet from the internal private network and modify the IP header to include the global IP address of the router in the originating address field, before the packet is transmitted into the Internet. The router stores the internal IP address of the originating node, destination IP address and port number in the NAT state table. When a request is returned to the same port from the destination IP address, the NAT matches the internal IP address that originated the request, and then modifies the IP header to insert the internal originating address as the destination address for the request.

NAT has proved useful in helping to keep IPv4 address available until the conversion to IPv6 is completed. However, as will be understood by those skilled in the art, an IPv6-in-IPv4 tunnel cannot be readily set up through a NAT router, even using the tunnel setup protocol described in applicant's co-pending patent application referenced above.

Proposals for NAT traversal do exist, however. For example, Internet Draft <draft-ietf-ngtrans-shipworm-08.txt>, C. Huitema, (Microsoft) dated Sep. 17, 2002, entitled "Teredo: Tunneling IPv6 over UDP through NAT" proposes a service that enables nodes located behind one, or several, IPv4 NAT(s) to obtain IPv6 connectivity by tunneling packets over User Datagram Protocol (UDP). The service is called the "Teredo" service. Running the service requires the assistance of "Teredo servers" and "Teredo relays". The Teredo servers are stateless, and only have to manage a small fraction of the traffic between Teredo clients. The Teredo relays act as IPv6 routers between the Teredo service and the "native" IPv6 Internet. This represents the first attempt to have NAT traversal for IPv6. However, Teredo does not accomodate any negotiation of parameters (IPv6 prefixes, domain name system (DNS), router peering, etc.), does not handle the optimization of encapsulation, and uses open relays that expose users to important security issues.

Consequently, there exists a need for a method and apparatus for automating and simplifying the establishment of IPv6-in-IPv4 tunnels to enable tunnel setup through a NAT router until the conversion to IPv6 is completed.

SUMMARY OF THE INVENTION

It is therefore an object of the invention to provide a tunnel setup protocol for automating the establishment of IPv6-in-IPv4 tunnels through an IPv4 network with network address translation (NAT).

The invention provides a tunnel setup protocol that facilitates a transition from IPv4 to IPv6 by permitting IPv6 devices to communicate across the IPv4 network, even if the communications are subject to network address translation (NAT). As used in this document, the word "NAT" means one or successive NAT devices in a network path. In accordance with the invention, a control channel is established between a tunnel client and a tunnel broker server. The control channel established between the tunnel client and the tunnel broker server is used to exchange tunnel configuration information and, optionally, to negotiate configuration parameters for the IPv6-in-IPv4 tunnel. After the tunnel configuration parameters have been established, the tunnel broker server configures a tunnel broker server endpoint. If NAT is present in the tunnel path, the tunnel broker client and the tunnel broker server use the tunnel broker endpoint.

The tunnel client also configures a tunnel endpoint, referred to as the tunnel client endpoint for the IPv6-in-IPv4 tunnel. If NAT is present in the tunnel path, the tunnel client endpoint is configured on the tunnel client.

The invention therefore permits the automated establishment of IPv6-in-IPv4 tunnels through an IPv4 network with NAT using a control channel. The use of the control channel enables the automated negotiation of specific configuration details, such as encapsulation selection, IPv6 prefix length, DNS delegation and router peering protocol. This facilitates the deployment of IPv6 networks and ameliorates the transition from IPv4 to IPv6. The invention is particularly useful with mobile devices, since new IPv6-in-IPv4 tunnels can be rapidly and automatically configured to permit true, unencumbered mobility of those devices even if they are behind an IPv4 NAT router, thus enhancing the attraction of deploying IPv6.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a method and apparatus for connecting IPv6 devices through an IPv4 network with network address translation (NAT) using a tunnel setup protocol (TSP) and User Datagram Protocol (UDP) or Transport Control Protocol (TCP), as described in Applicant's Internet-Draft, which bears a date of Jun. 24, 2002 and is entitled "TSP-TEREDO: Stateful IPv6 over IPv4 Tunnels with NAT using TSP and TEREDO, draft-parent-blanchet-ngtrans-tsp-teredo-00.txt", which is incorporated herein by reference.

In accordance with the invention, a control channel is established between a tunnel client and a tunnel broker server using either User Datagram Protocol (UDP) or Transport Control Protocol (TCP), if NAT is performed anywhere in the network between the tunnel client and the tunnel broker. Both the tunnel client and the tunnel broker server must be connected to the IPv4 network. The control channel established between the tunnel client and the tunnel broker server is used to negotiate configuration parameters other than the transport protocol for the IPv6-in-IPv4 tunnel. After the configuration parameters are established, the tunnel broker server configures a tunnel broker server endpoint and the tunnel client configures a tunnel client endpoint for the IPv6-in-IPv4 tunnel. The respective tunnel endpoints are configured on the respective tunnel client and tunnel broker server. The invention therefore permits the automated establishment of IPv6-in-IPv4 tunnels through IPv4 networks with NAT, which facilitates the deployment of IPv6 networks and ameliorates the transition from IPv4 to IPv6.

Figure 1:
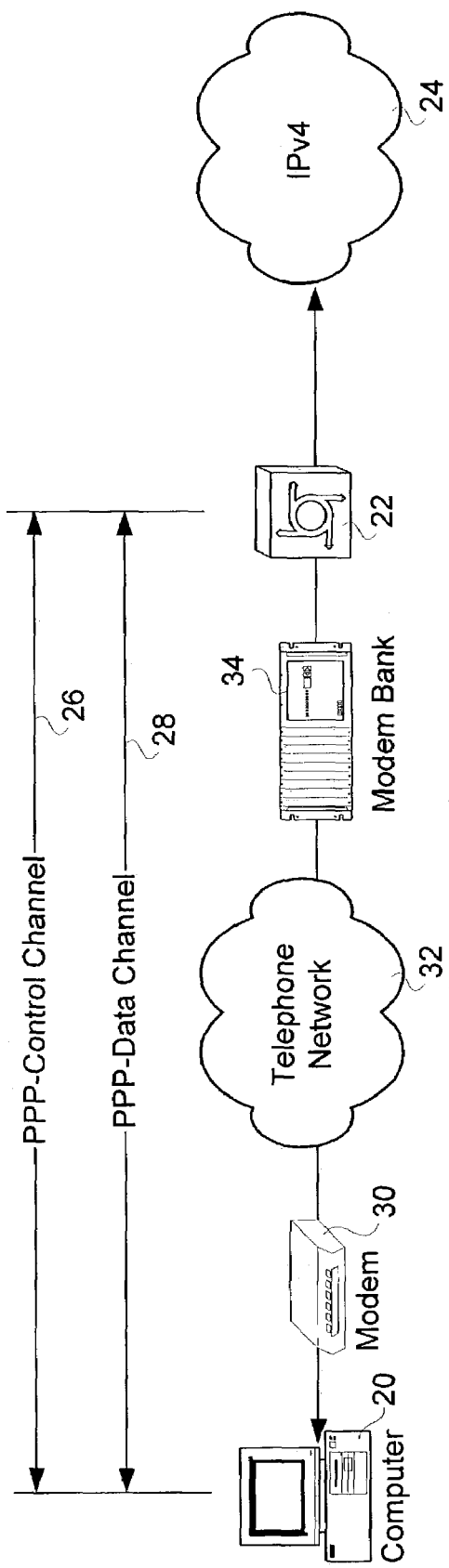
FIG. 1 is a schematic diagram of a point-to-point (PPP) data connection over a dial-up link between a computer and a network access server.

FIG. 1 is a schematic diagram of a point-to-point (PPP) dial-up connection between a client computer 20 and a network access server 22 to provide access to an IPv4 network 24 in a manner well known in the art. As is well understood, a PPP-control channel 26 is established over the dial-up connection between the client computer 20 and the network access server 22. The dial-up connection passes through a modem 30, a switched telephone network 32 and a modem bank 34 in a manner well known in the art. The PPP control channel 26 shares the dial-up connection with a PPP data channel 28, which is used to send IPv4 data packets from the client computer 20 to one or more selected hosts in the IPv4 network 24.

Figure 2:
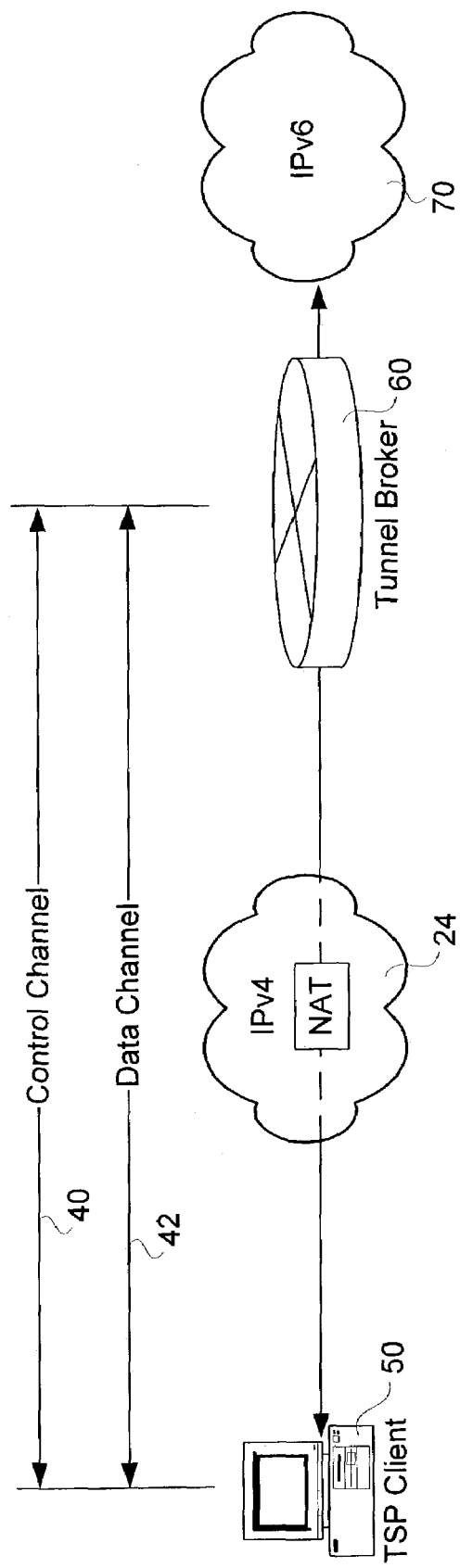
FIG. 2 is a schematic diagram of a connection between an IPv4/IPv6 node and an IPv6 network implemented in accordance with the invention.

FIG. 2 is a schematic diagram illustrating one implementation of a system provisioned with a tunnel setup protocol through an IPv4 network with NAT in accordance with the invention. A control channel 40 is established through the IPv4 network 24 between a tunnel client 50 and a tunnel broker server 60 using User Datagram Protocol (UDP) or Transport Control Protocol (TCP) messaging, although for reasons of efficiency, UDP is preferred. The control channel 40 is used to negotiate parameters for establishing an IPv6-in-IPv4 tunnel through the IPv4 network 24. The tunnel is used to establish a data channel 42 that extends between first and second tunnel endpoints, the tunnel client 50 and the tunnel broker server 60. The data channel is used to transfer IPv6 data packets through the IPv4 network using UDP or TCP. The IPv6 data packets are encapsulated at the opposite endpoints of the IPv6-in-IPv4 tunnel, as will be explained below in more detail.

FIGS. 3a-3e are flow diagrams illustrating the tunnel setup protocol in accordance with the invention. The process begins in step 90 when a tunnel setup protocol (TSP) client, hereinafter referred to as a tunnel client 50 (FIG. 2) connects to a tunnel broker server (TB) 60 using UDP or TCP, as explained above. If the tunnel client 50 is aware that it is behind a NAT in the IPv4 network, the tunnel client 50 preferably uses UDP messaging to establish the control channel 40, since the protocol used to establish the control channel will also be used to establish the IPv4 tunnel. After the control channel 40 is established, the tunnel client sends the version of the TSP that it supports using the control channel 40 to the tunnel broker server 60 (step 92). On receipt of the TSP protocol version, the tunnel broker server 60 determines whether it supports the same version of the tunnel setup protocol (step 94). If it is not provisioned to support the tunnel client's version of the tunnel setup protocol, the tunnel broker server 60 returns an error message via the control channel 40 (step 96) and branches to connector C (see FIG. 3e), where the tunnel broker server 60 determines whether it has an alternate list of tunnel broker servers that it can provide to the tunnel client (as will be explained below in more detail). If the tunnel broker server 60 does support the tunnel client's version of the tunnel setup protocol, the tunnel broker server 60 returns a list of its capabilities (step 98) to the tunnel client 50 over the control channel 40. The capabilities of the tunnel broker server 60 include, for example, authentication mechanisms, types of tunnel supported, lengths of IPv6 prefixes that can be assigned, as well as Domain Name Service (DNS) delegation supported, and router peering protocols supported, etc.

In step 100, the tunnel client 50 determines whether the capabilities of the tunnel broker server 60 are satisfactory for the purposes it requires. If not, the tunnel client 50 closes the tunnel setup protocol session (step 102) and the process ends. Otherwise, the tunnel client 50 selects an authentication mechanism from the list supported by the tunnel broker server 60 and specifies the authentication mechanism in an authentication message sent via the control channel 40 to the tunnel broker server 60 (step 104). Subsequently, the tunnel broker server 60 and the tunnel client 50 exchange authentication data (step 106) via the control channel 40. In step 108, the tunnel broker server 60 verifies the tunnel client authentication data.

Figure 3A:
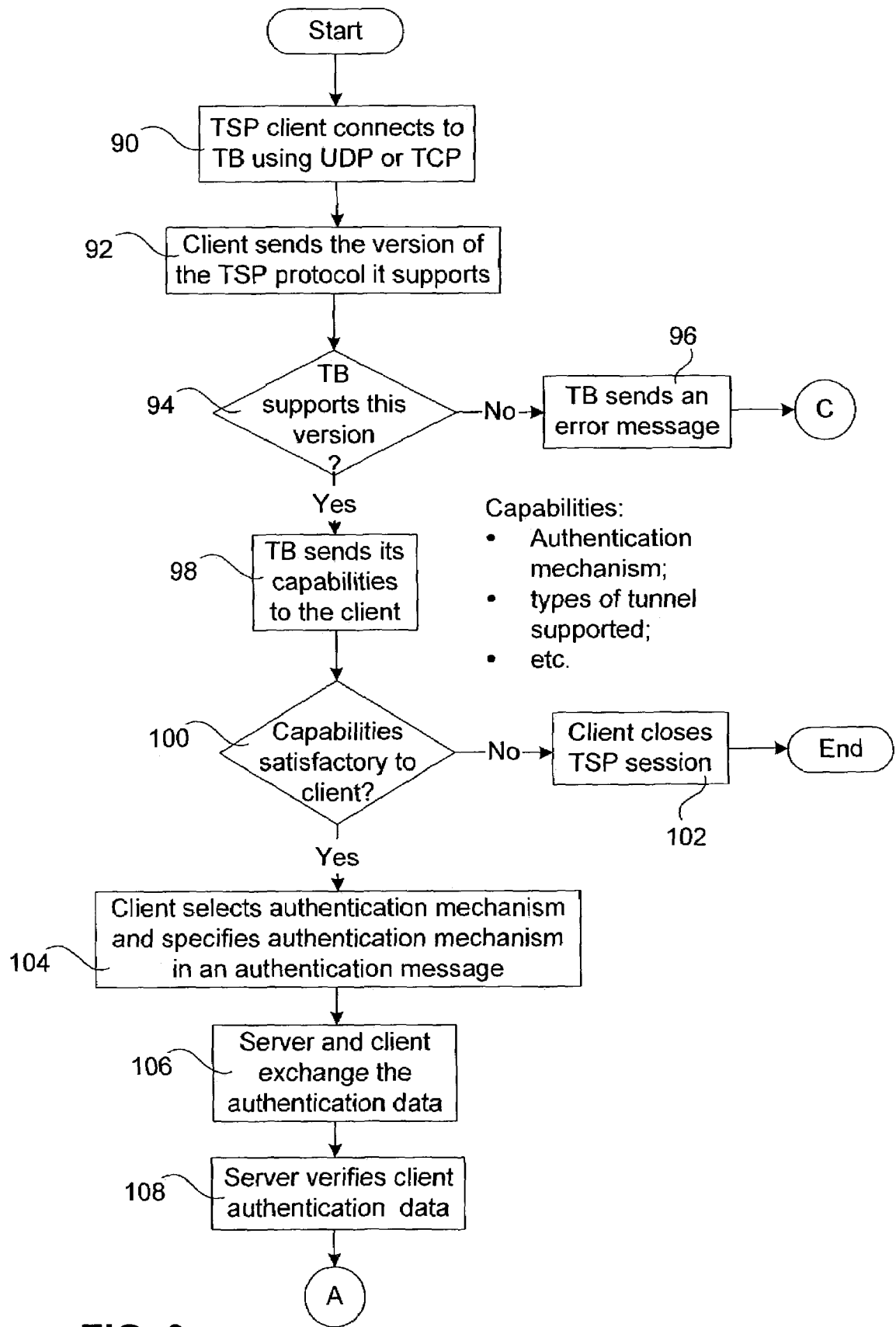
FIGS. 3a-3e are a flow chart of a method for connecting IPv6 devices through an IPv4 network using UDP and a tunnel setup protocol in accordance with the invention.
Figure 3B:
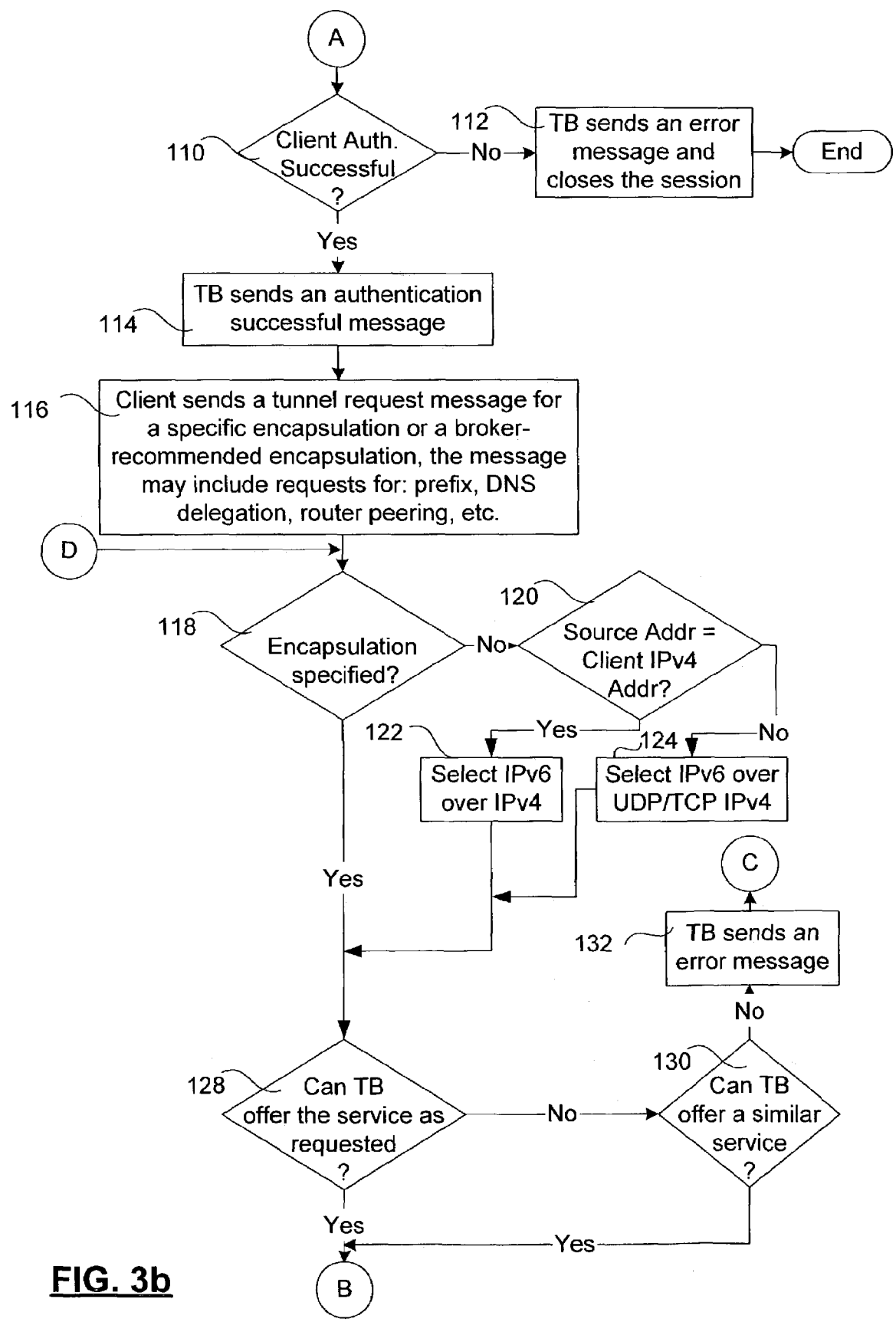
Figure 3C:
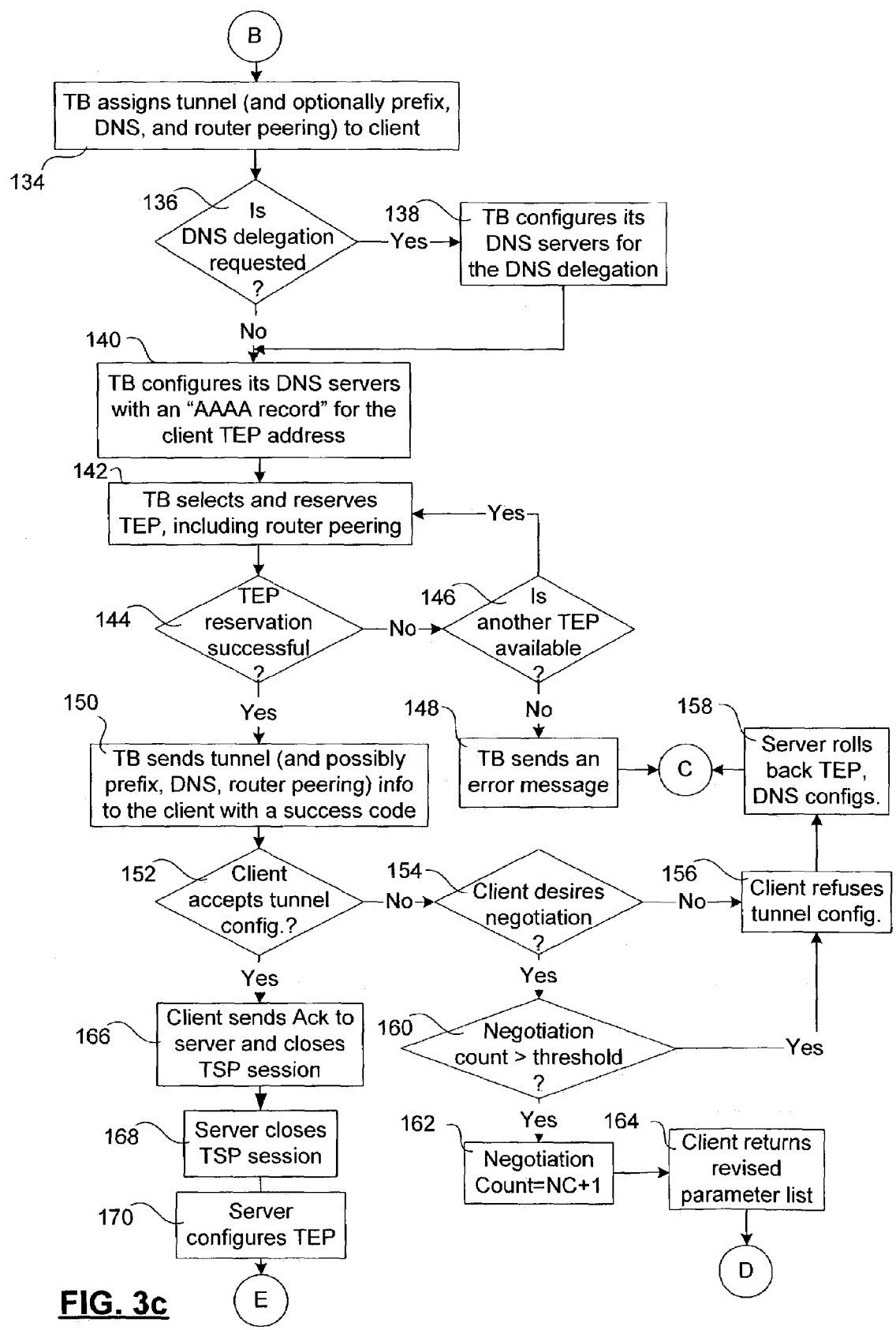

As shown in FIG. 3b, after verifying the tunnel client authentication data, the tunnel broker server 60 determines whether the tunnel client 50 is authorized to establish the tunnel (step 110). If the tunnel client 50 is not authorized to establish the tunnel, the tunnel broker server 60 returns an error message via the control channel 40 and closes the session (step 112). If the tunnel client 50 is authorized to establish the tunnel, the tunnel broker server 60 returns an authentication successful message (step 114) to the tunnel client 50. The tunnel client 50 then sends a tunnel request message via the control channel 40 (step 116) to the tunnel broker server 60. The tunnel request message may include requests for a specific encapsulation or a broker-recommended encapsulation, an IPv6 prefix, a DNS delegation, router peering, etc., as will be explained below in more detail. On receipt of the tunnel request message, the tunnel broker server 60 determines whether the encapsulation protocol has been specified by the tunnel client 50 (step 118). If an encapsulation protocol has not been specified, the tunnel broker 60 examines the tunnel request message to determine whether an IPv4 source address of the tunnel request message matches an IPv4 client address in the tunnel request message. If there is a match, an IPv6 in IPv4 tunnel can be established in the IPv4 network between the tunnel client 50 and the tunnel broker 60. Consequently, the tunnel broker 50 returns a recommendation that an IPv6-in-IPv4 tunnel be established (step 122), which is the most efficient and reliable protocol. If the two addresses do not match, the tunnel broker 60 recommends that an IPv6-in-(UDP/TCP) IPv4 tunnel be established (step 124). The selection of UDP or TCP depends, as explained above, on which protocol was used to establish the control channel. In either case, the tunnel broker 60 then examines the balance of the tunnel request message to determine if it is provisioned to offer the service as requested (step 128). If not, the tunnel broker server 60 determines (step 130) whether it is provisioned to offer a similar service. If not, the tunnel broker server 60 returns an error message via the control channel 40 and branches to connector C, where it determines in step 190 (see FIG. 3e) if it is provisioned with a list of alternate tunnel broker servers. If not, it closes the session (step 192). If so, it returns the list (step 194) via the control channel 40 to the tunnel client 50 to permit the tunnel client 50 to attempt the establishment of an IPv6-in-IPv4 tunnel using another tunnel broker.

If the tunnel broker is provisioned to provide the requested service or a similar service as determined in steps 128, 130, the tunnel broker server 60 assigns an IPv6-in-IPv4 or an IPv6-in-(UDP/TCP)IPv4 tunnel, as determined in steps 120-124, to the tunnel client 50. The tunnel broker may also assign an IPv6 prefix in a manner well known in the art, provide domain name service (DNS) delegation, as will be explained below in more detail, and router peering to the tunnel client 50, as appropriate (step 134, FIG. 3c).

In step 136, the tunnel broker server 60 determines whether DNS delegation has been requested. If so, the tunnel broker server 60 configures its DNS servers for the DNS delegation by registering the tunnel client's DNS server addresses for name space associated with the assigned IPv6 prefix (step 138) to DNS servers associated with the tunnel broker server 60. The tunnel broker server 60 also configures its DNS servers with an "AAAA record" (step 140) for the client tunnel endpoint address, in a manner known in the art. In step 142 (FIG. 3c), the tunnel broker server 60 selects and reserves a tunnel endpoint for the tunnel it assigned in step 134. The configuration of the tunnel endpoint includes configuring router peering. The tunnel broker then awaits confirmation that the tunnel endpoint reservation was successful (step 144). If the reservation was not successful, the tunnel broker server 60 determines in step 146 whether another tunnel endpoint is available by, for example, consulting a table of tunnel endpoints stored in the tunnel broker server memory (step 146). If another tunnel endpoint is not available, or all tunnel endpoints are at capacity, the tunnel broker server 60 sends an error message over the control channel (step 148) to the tunnel client 50 and branches to steps 190-194, as explained above.

If the tunnel endpoint configuration is determined to be successful in step 144, the tunnel broker server 60 sends the tunnel configuration parameters along with any required IPv6 prefix, DNS information, router peering information, etc. to the tunnel client 50 using the control channel 40, along with a success code (step 150). On receipt of this information, the tunnel client determines whether it will accept the tunnel configuration (step 152). If it does not find the tunnel configuration acceptable, the tunnel client determines (step 154) whether it will negotiate a different configuration. It should be noted that the tunnel client may be implemented with or without the capacity for parameter negotiation. If it is not equipped for negotiation or decides to terminate negotiation, the process moves to step 156, in which the client refuses the tunnel configuration and advises the tunnel broker 60 by sending a refusal message over the control channel 40 (step 156). On receipt of the refusal message, the tunnel broker server 60 rolls back the configuration of the tunnel endpoint, the DNS configurations, etc. (step 158) and branches to steps 190-194, as explained above.

If the client determines in step 154 that it will negotiate the tunnel configuration, it may, for example, assess whether negotiation should proceed by comparing a negotiation count with a predetermined threshold (step 160). If the negotiation count is greater than the threshold, the process branches to steps 156, 158 and 190-194, as explained above. Otherwise, the negotiation counter is incremented (step 162) and the tunnel client 50 returns via the control channel 40 a revised parameter list to the tunnel broker server 60 and the process branches back to step 118.

If the tunnel client 50 accepts the tunnel configuration in step 152, the tunnel client 50 sends an acknowledgement message (ACK) to the tunnel broker server 60 and closes the TSP session (step 166). On receipt of the ACK message, the tunnel broker server 60 also closes the TSP session (step 168). The respective TSP sessions are closed because the same channel is used for data traffic. In step 170, the tunnel broker server then configures the tunnel end point (TEP).

Figure 3D:
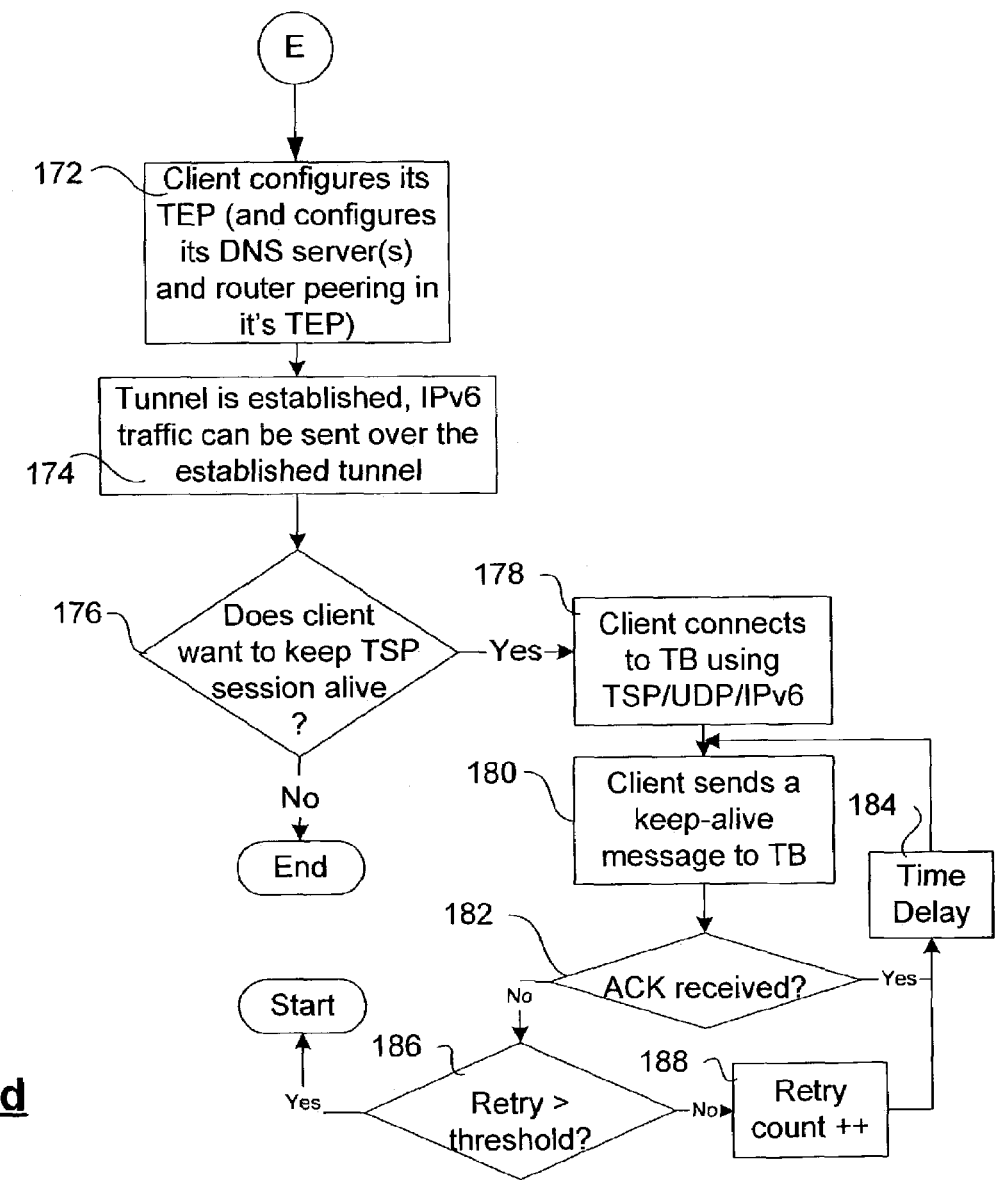
Figure 3E:
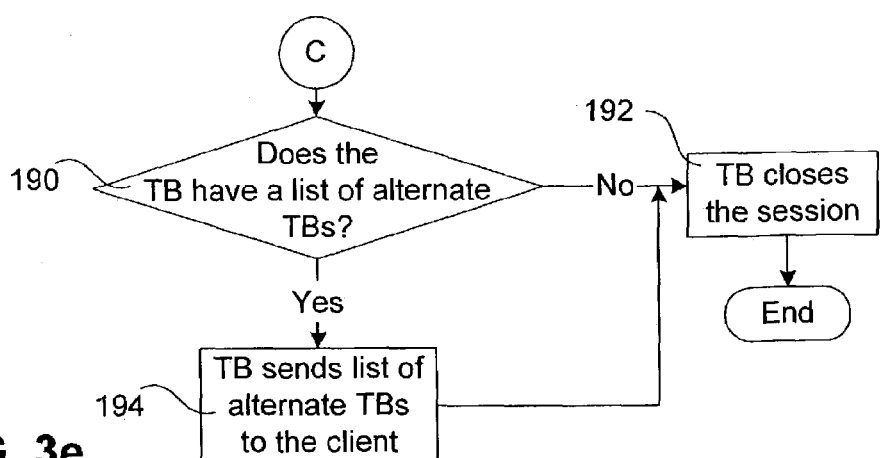

As shown in FIG. 3d, the tunnel client 50 configures its tunnel endpoint and, if required, configures its DNS server (s) as explained above, and router peering in its tunnel endpoint, if required (step 172). The tunnel is thus established and IPv6 traffic can be sent over the established tunnel (step 174). The tunnel client 50 then determines whether it wants to keep the tunnel setup protocol session alive (step 176). If so, the tunnel client 50 connects to the tunnel broker server 60 using Tunnel Session Protocol-over-User Datagram Protocol-over-IPv6 (TPS/UDP/IPv6) (step 178). After the connection is established, as will be explained below in more detail with reference to FIG. 4, the tunnel client 50 sends a keep-alive message to the tunnel broker server 60 via the control channel 40 (step 180) and waits for an acknowledgement (ACK) of the keep-alive message (step 182). If the ACK is received, as determined in step 182, the tunnel client 50 waits for a predetermined period of time before sending another keep-alive message (step 180) and the loop (steps 180-184) is repeated. If an ACK is not received in step 182, the tunnel client verifies (step 186) that a retry count threshold has not been exceeded (step 186). If the retry count is less than a predetermined threshold, the retry count is incremented (step 188) and after the predetermined time delay (step 184) the tunnel client 50 repeats steps 180, 182. Most NAT devices close the translation table entry when no traffic occurs for some predetermined period of time, however, the keep-alive messages keep the NAT state open for the established tunnel. If the tunnel client 50 determines in step 186 that the retry count exceeds the threshold, the NAT state might have been closed and the tunnel setup process should restart from the beginning (FIG. 3a).

Figure 4:
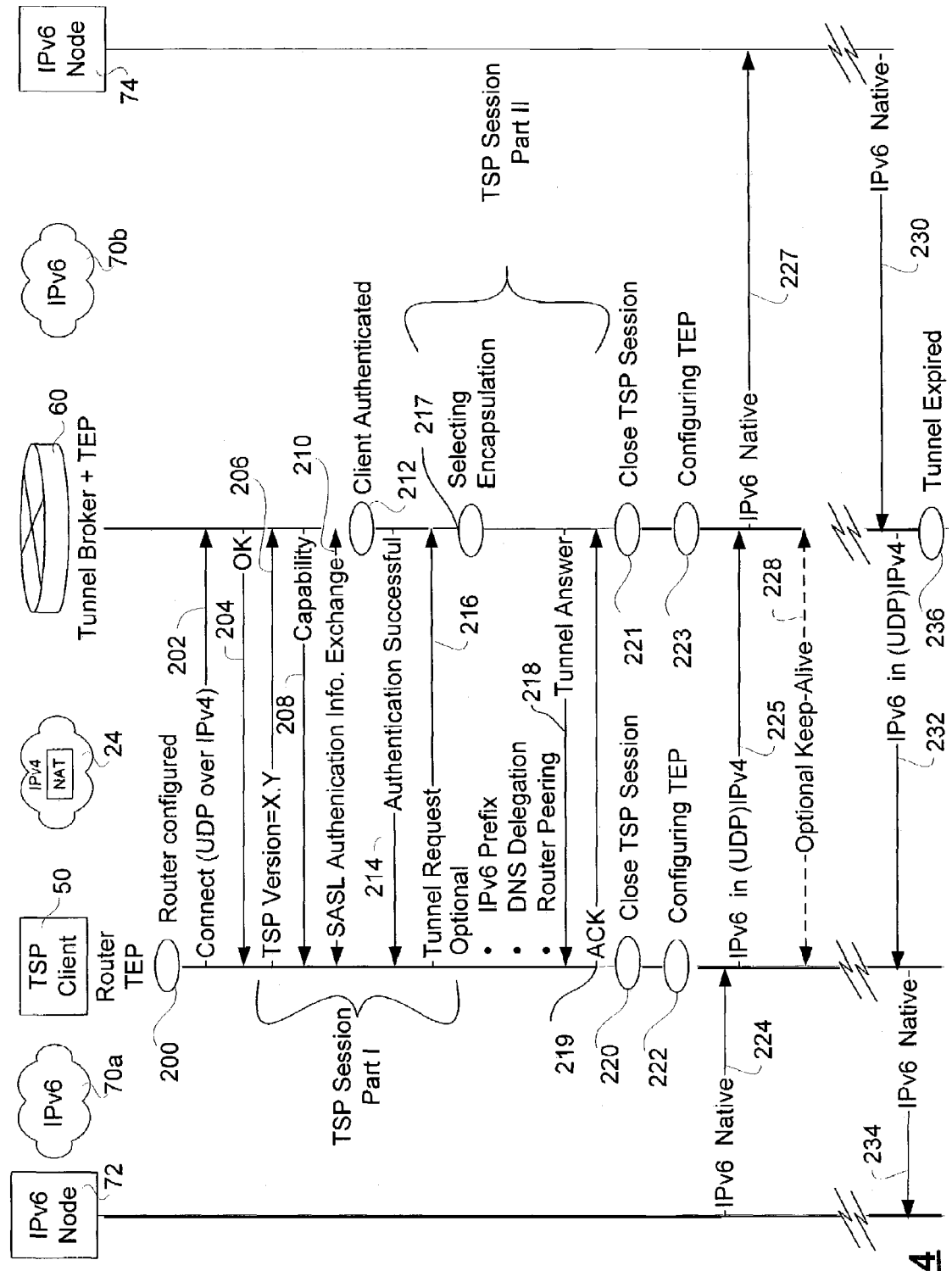
FIG. 4 is a connection progress diagram of the establishment and maintenance of an IPv6-in-IPv4 tunnel between a tunnel client and a tunnel broker server using UDP and a tunnel setup protocol, and subsequent use of the tunnel by IPv6 nodes connected to respective IPv6 networks.

FIG. 4 is a connection progression diagram illustrating an exemplary implementation of the tunnel setup protocol in accordance with the invention. In this example, an IPv6-in-IPv4 tunnel is established between a tunnel client 50 and a tunnel broker server 60, which respectively serve as endpoints for the tunnel. The tunnel client 50 is a router that is connected to an IPv6 network 70a and the IPv4 network 24. Consequently, the tunnel client 50 is provisioned with an IPv4 stack as well as an IPv6 stack and is further provisioned to encapsulate IPv6 packets in IPv4 packets, as well as to decapsulate IPv6 packets encapsulated in IPv4 packets, to permit IPv6 traffic to pass through the tunnel. The tunnel broker server 60 is likewise connected to both the IPv4 network 24 and the IPv6 network 70b and provisioned with the same stacks and data encapsulation/decapsulation capability.

As shown in the diagram, in step 200, the router is configured as a tunnel client 50. Once configured as a tunnel client 50 so that it knows how to contact the tunnel broker server 60, the router is provisioned to establish a control channel 40 to the tunnel broker server 60, as explained above. Subsequently, in step 202, the tunnel client 50 sends a connect message to the tunnel broker server 60 to establish the control channel 40. The tunnel client 50 may be prompted to establish the control channel for any number of reasons. For example, the tunnel client 50 is prompted to establish the control channel when the IPv6 node 72 generates IPv6 traffic addressed to an IPv6 node in a different IPv6 network, on reboot, on re-establishing IPv4 re-connectivity, etc. On receipt of the connect message, the tunnel broker server 60 returns an acknowledgement message (step 204) and the control channel 40 is established. The tunnel client 50 then sends the version of the tunnel setup protocol it supports to the tunnel broker server 60 (step 206) via the control channel 40. The tunnel broker server 60 returns, via the control channel 40, a list of the tunnel setup functions it supports (step 208). The tunnel client 50 selects an authentication mechanism and authentication information is exchanged (step 210). In step 212, the tunnel broker server 60 determines that the tunnel client 50 is authorized for the service and returns an authorization successful message (step 214). On receipt of the message, the tunnel client 50 formulates a tunnel request message which it sends to the tunnel broker server 60 in step 216. The request, as explained above, optionally includes a request for an IPv6 prefix, DNS delegation, and a router peering.

On receipt of the request, the tunnel broker server 60 examines the contents of the request to determine if the source address equals the IPv4 address, as explained above with reference to steps 120-124 of FIG. 3b. If they do not match, the tunnel broker determines that there is NAT in the control channel path, and selects (step 217) IPv6 over UDP IPv4, or IPv6 over TCP IPv4, depending on the protocol used to establish the control channel, as explained above. In this example, the tunnel broker selects IPv6 over UDP IPv4. The tunnel broker server 60 then returns a tunnel answer message (step 218), which includes tunnel configuration parameters, including IPv4 and IPv6 addresses for both the tunnel broker server and the tunnel client endpoints as well as the encapsulation protocol and any other information requested by the tunnel client 50 in step 216. On receipt of the tunnel answer message, the tunnel client 50 returns an acknowledgement message (ACK) (step 219) and ends the TSP session (step 220). On receipt of the ACK sent by the tunnel client in step 219, the tunnel broker server 60 also ends the TSP session (step 221).

Meanwhile, the tunnel client 50 configures its tunnel endpoint (step 222), and the tunnel broker server likewise configures its tunnel endpoint (step 223). Thereafter, the tunnel client begins to send data traffic through the configured tunnel, as the traffic is received from IPv6 nodes that it services. In step 224, the tunnel client 50 receives one or more data packets in a native IPv6 protocol from an IPv6 node 72. The data packets are encapsulated in UDP/IPv4 by the tunnel client 50, and sent through the tunnel in step 225. On receipt of the UDP/IPv4 datagrams, the tunnel broker server decapsulates the datagrams and forwards them in the native IPv6 protocol to the addressee (an IPv6 node 74) (step 227).

The tunnel client 50 may optionally send keep-alive messages (step 228) to keep the NAT state open. Keep alive messages use the TSP protocol over UDP/IPv6.

After the tunnel expires (step 236), tunnel broker server 60 deconstructs the tunnel endpoint, DNS delegation and router peering so that traffic can no longer pass through the tunnel, as will be explained below with reference to FIG. 5.

Figure 5:
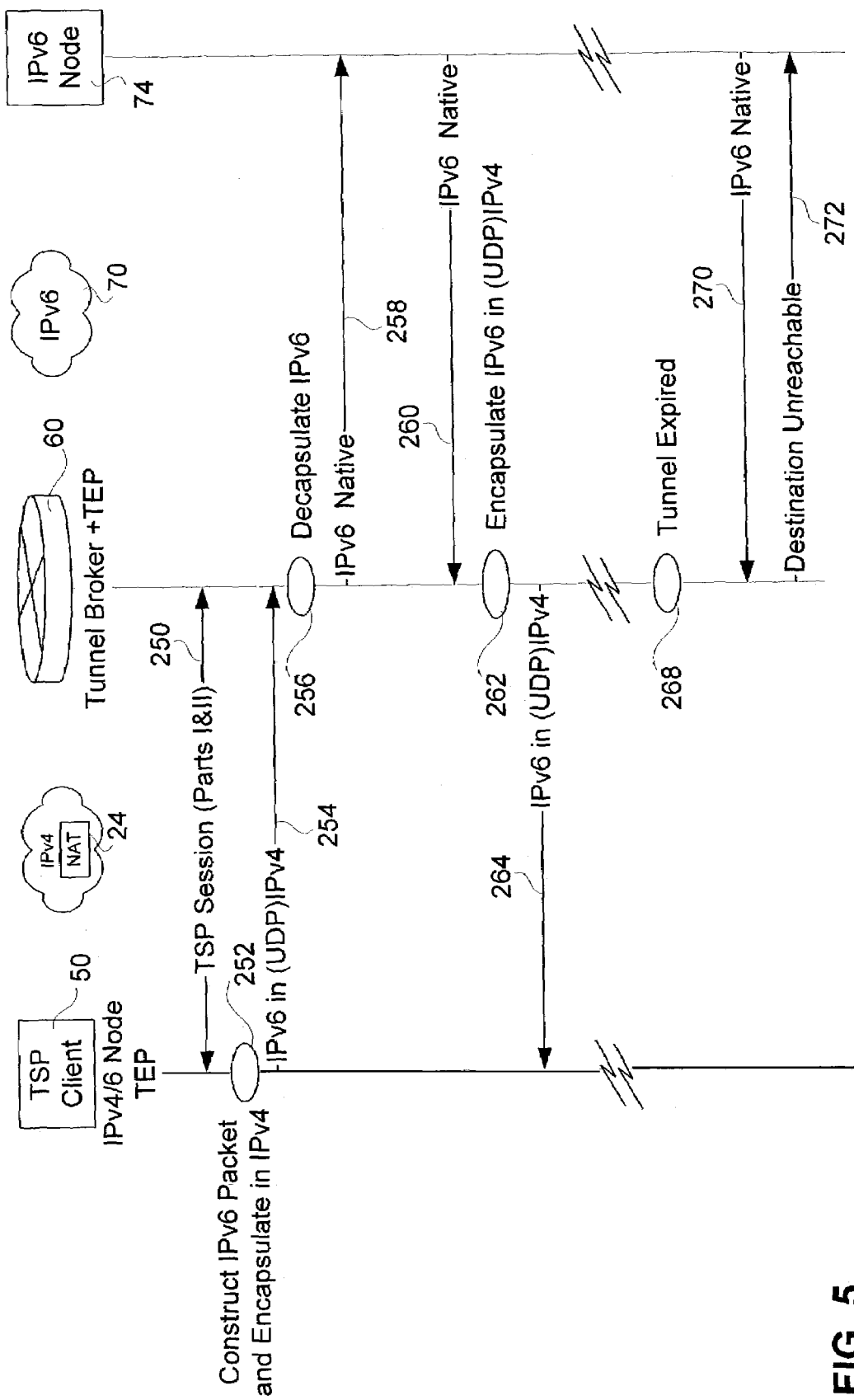
FIG. 5 is a connection progress diagram of another implementation of the invention in which a tunnel client connects to a tunnel broker server and establishes an IPv6-in-IPv4 tunnel using UDP for the purposes of communicating with an IPv6 node in an IPv6 network.

FIG. 5 is a connection progression diagram that further explains the process in accordance with the invention. In this example, the tunnel setup protocol client 50 is an IPv4/6 node that serves as a tunnel endpoint. In step 250, the tunnel protocol session parts I and II are performed as described above with reference to FIG. 4. In step 252, the tunnel client 50 starts an IP session by constructing an IPv6 packet and encapsulating the IPv6 packet in a UDP/IPv4 packet in a manner known in the art. The IPv6 packet encapsulated in the UDP/IPv4 packet is sent in step 254 through the tunnel to the tunnel broker server 60. The tunnel broker server 60 decapsulates the IPv6 packet (step 256) and forwards it in IPv6 native format to the IPv6 node 74 (step 258). The IPv6 node 74 returns an IPv6 packet in IPv6 native format (step 260). The packet is encapsulated in a UDP/IPv4 packet by the tunnel broker server 60 (step 262) and forwarded through the tunnel in step 264. In step 268, the tunnel lifetime expires and the tunnel endpoint is deconstructed, as explained above. Thereafter, when the IPv6 node 74 sends an IPv6 packet in native format (step 270), the tunnel broker returns a destination unreachable packet (step 272) in a manner known in the art.

Figure 6:
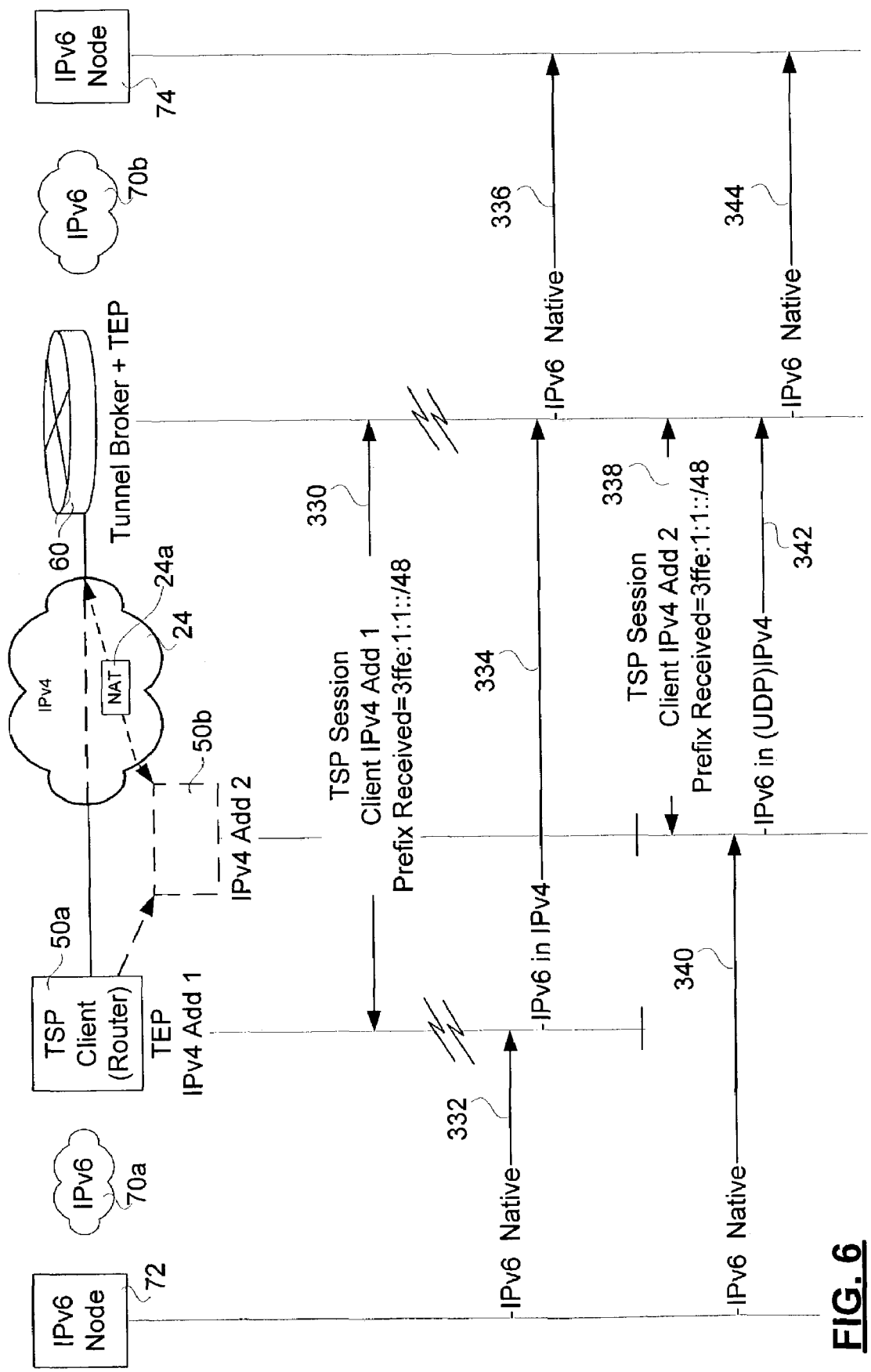
FIG. 6 is a connection progress diagram illustrating the establishment of IPv6-in-IPv4 tunnels by a mobile tunnel client that uses an IPv6-in-IPv4 tunnel in a first location and an IPv6-in-UDP/IPv4 tunnel in a second location.

FIG. 6 is a connection progression diagram that illustrates yet another implementation of the system in accordance with the invention. In this example, the tunnel client 50 is a mobile device, such as a cellular telephone, a personal data assistant (PDA) or a laptop computer, which serves as a router in an IPv6 subnetwork. As illustrated, the mobile device in a first location functions as a tunnel client 50a having an IPv4 address (Add 1). In the first location, the mobile tunnel client 50a commences and performs a tunnel setup protocol session with the tunnel broker (step 330) and in the course of the tunnel setup protocol session receives an IPv6 prefix from the tunnel broker server 60. In this example, the prefix received is "3ffe:1:1::/48. As is well known in the art, this prefix is known as a "/48" prefix which permits the tunnel client router to assign session addresses to IPv6 devices in the domain it controls, in a manner well known in the art. After the tunnel is established in step 330, the IPv6 node 72 is enabled to communicate with the IPv6 node 74 (steps 332-336) by sending and receiving IPv6 packets in native format.

Subsequently, the mobile tunnel client 50 moves to location 50b and its service provider in the IPv4 network assigns a new IPv4 address (Add 2). Consequently, a new tunnel must be established. However, after the move, a NAT 24a is introduced into the tunnel path between the tunnel client 50 in location 50b and the tunnel broker server 60. The new tunnel must therefore be setup using UDP (or TCP) over IPv4, as explained above with reference to FIG. 4. The tunnel client 50b and the tunnel broker server 60 therefore initiate and performs the tunnel setup protocol session (step 338), and the UDP/IPv4 tunnel is established, as explained above.

After the tunnel parameters are negotiated, the tunnel client 50b receives the same IPv6 prefix "3ffe:1:1::/48", because the broker recognizes the same client and is provisioned to provide the same prefix, because for the sake of efficiency the client wishes to keep the same prefix. Consequently, a new tunnel is established between the mobile tunnel client 50b and the tunnel broker server 60 that permits the IPv6 node 72 to again send IPv6 packets in native format to the IPv6 node 74 (steps 340-344). By receiving the same IPv6 prefix, the IPv6 node 72 keeps its same IPv6 address. Consequently, in the IPv6 realm the mobility of the IPv4 tunnel end point is not perceived. As will be understood by persons skilled in the art, packets transferred via the tunnel through the IPv4 network (step 334) are encapsulated with UDP over IPv4 headers because of the NAT 24a in the path through IPv4 network 24 established from the new location 50b of the tunnel client 50.

The methods and apparatus in accordance with the invention therefore permit mobile devices to automatically establish IPv6-in-IPv4 tunnels through the IPv4 network, with or without the existence of NAT in the path, to permit IPv6 nodes to communicate with other IPv6 nodes in other IPv6 subnetworks. This is of critical importance to the exponentially expanding use of wireless devices and mobile devices in general, and permits seamless networking of such devices.

The embodiment(s) of the invention described above is(are) intended to be exemplary only. The scope of the invention is therefore intended to be limited solely by the scope of the appended claims.

We claim:

1. A method for connecting an IPv6 devices in a first IPv6 network through an IPv4 network with network address translation (NAT) to an IPv6 node in a second IPv6 network, comprising steps of:

sending a message from a tunnel client to a tunnel broker server to establish a control channel through the IPv4 network between the tunnel client the tunnel broker server, the tunnel client being connected to the IPv4 network and the first IPv6 network, and the tunnel broker server being connected to the IPv4 network and the second IPv6 network;

sending to the tunnel broker server, via the control channel, a request message to establish an IPv6-in-IPv4 tunnel through the IPv4 network, the request including tunnel configuration parameters desired by the tunnel client;

determining at the tunnel broker server whether network address translation (NAT) occurs between the tunnel client and the tunnel broker server;

when the NAT occurs between the tunnel client and the tunnel broker, setting up the IPv6-in-IPv4 tunnel through the NAT using a tunnel setup protocol (TSP) session, between the tunnel client and the tunnel broker server, and subsequently maintaining a NAT state of the NAT open to preserve the IPv6-in-IPv4 tunnel for at least a duration of a communications session between the IPv6 node and the IPv6 device;

receiving at the tunnel broker server, from the tunnel client, a version of a tunnel session protocol installed at the tunnel client;

determining whether the version of the tunnel session protocol is supported by the tunnel broker server; and when the version of the tunnel session protocol is not supported by the tunnel broker server, returning an error message to the tunnel client.

2. The method as claimed in claim 1 wherein the step of determining whether there is NAT between the tunnel client and the tunnel broker server comprises comparing a source address extracted from an IPv4 message encapsulating the request message with an IPv4 tunnel client endpoint address specified in the request.

3. The method as claimed in claim 1 wherein after the step of returning an error message, the method further comprises a step of returning, from the tunnel broker server to the tunnel client, a list of alternate tunnel broker servers to permit the tunnel client to attempt to obtain service from another tunnel broker server.

4. The method as claimed in claim 1 further comprising, when the tunnel broker server supports the version of the tunnel session protocol, a step of returning, service capabilities of the tunnel broker server to the tunnel client.

5. The method as claimed in claim 4 wherein the service capabilities comprise a specification of authentication types, and the method further comprises steps of selecting by the tunnel client an authentication type, and sending authentication information to the tunnel broker server to permit the tunnel broker server to verify that the client is authenticated for the service.

6. The method as claimed in claim 1 wherein the step of sending the message through the IPv4 network comprises a step of formulating either one of a Transfer Control Protocol (TCP) and an User Datagram Protocol (UDP) message that is sent to the tunnel broker server to establish the control channel.

7. The method as claimed in claim 1 wherein the step of sending the request message comprises a step of formulating tunnel configuration parameters, comprising a tunnel action type, a tunnel type, and an IPv4 tunnel endpoint address.

8. The method as claimed in claim 7 wherein the tunnel configuration parameters further comprise a request for an IPv6 prefix of a specified length, and a domain name service (DNS) delegation and router peering.

9. The method as claimed in claim 1 wherein the step of receiving the acceptance from the tunnel broker server comprises a step of receiving information specifying a tunnel lifetime, a tunnel client endpoint IPv4 address, a tunnel client endpoint IPv6 address, a tunnel broker server endpoint IPv4 address, and a tunnel broker server endpoint IPv6 address, and an indication that the control channel is subject to NAT and the control channel must be used as a data channel.

10. The method as claimed in claim 9 wherein subsequent to receiving the information, the tunnel client further performs a step of closing the TSP session and configuring the tunnel client endpoint using the tunnel client endpoint IPv4 address and the tunnel client endpoint IPv6 address.

11. The method as claimed in claim 1 wherein prior to sending an acceptance of the request with a specification of information respecting the tunnel configuration parameters desired by the tunnel client, the tunnel broker server performs a step of reserving a tunnel broker server endpoint.

12. The method as claimed in claim 11 further comprising, when the step of reserving the tunnel broker server endpoint is unsuccessful, a step of returning an error message to the tunnel client, along with a refusal to establish the tunnel.

13. The method as claimed in claim 12 wherein the tunnel broker server further returns a list of alternate tunnel broker servers to the tunnel client, to permit the tunnel client to attempt to establish a tunnel using another tunnel broker server.

14. The method as claimed in claim 1 wherein after the tunnel client receives an acceptance of the request with a specification of information respecting the tunnel configuration parameters desired by the tunnel client, the tunnel client periodically sends a keep-alive message to the tunnel broker server to maintain the NAT state opened to preserve the tunnel.

15. An Apparatus for connecting an IPv6 device in a first IPv6 network through an IPv4 network with network address translation (NAT) to an IPv6 node in a second IPv6 network, comprising:
a tunnel broker server connected to the IPv4 network and the second IPv6 network, the tunnel broker server being programmed to:
respond to a message from a tunnel client establishing a control channel through the IPv4 network between the tunnel client and the tunnel broker server, the tunnel client being, connected to the iPv4 network and the first IPv6 network;
authenticate the tunnel client to establish an IPv6-in-IPv4 tunnel through the IPv4 network;
accept desired parameters for a configuration of the IPv6-in-IPv4 tunnel from the tunnel client;
determine whether or not network address translation (NAT) occurs between the tunnel client and the tunnel broker; and
when the NAT occurs between the tunnel client and the tunnel broker, setting up the IPv6-in-IPv4 tunnel through the NAT using a tunnel setup protocol (TSP) session, between the tunnel client and the tunnel broker server, and subsequently maintaining a NAT state of the NAT open to preserve the IPv6-in-IPv4 tunnel for at least a duration of a communications session between the IPv6 node and the IPv6 device;
receiving at the tunnel broker server, from the tunnel client, a version of a tunnel session protocol installed at the tunnel client;
determining whether the version of the tunnel session protocol is supported by the tunnel broker server; and
when the version of the tunnel session protocol is not supported by the tunnel broker server, returning an error message to the tunnel client.

16. The Apparatus as claimed in claim 15 wherein the tunnel broker server is further programmed to return to the tunnel client an encapsulation specification and parameters for a configuration of the IPv6-in-IPv4 tunnel after accepting the desired parameters from the tunnel client.

17. The Apparatus as claimed in claim 15 wherein the tunnel broker server is programmed to return a list of other tunnel broker servers which may be used by the tunnel client, when the tunnel broker server is not able to provide service in accordance with desired parameters for a configuration of the IPv6-in-IPv4 tunnel from the tunnel client.

18. The Apparatus as claimed in claim 16 wherein the tunnel broker server is programmed to configure a tunnel end point after returning parameters for a configuration of the IPv6-in-IPv4 tunnel to the tunnel client and closing the TSP session.

19. The Apparatus as claimed in claim 15 wherein the tunnel client is programmed to:
establish a control channel with the tunnel broker server;
provide authentication information to the tunnel broker server to permit the tunnel broker server to authenticate the tunnel client;
provide to the tunnel broker desired parameters for a configuration of the tunnel;
accept from the tunnel broker an encapsulation specification and parameters for the configuration of the tunnel;

configure a tunnel endpoint given the parameters for the configuration of the tunnel after acknowledging acceptance of the configuration of the tunnel and closing the TSP session; and encapsulate packets to be sent through the tunnel using the encapsulation specification provided by the tunnel broker.

20. The Apparatus as claimed in claim 19 wherein the tunnel client is a router and is further programmed to request an IPv6 prefix of a specified length when providing the tunnel broker server with the desired parameters for a configuration of the tunnel.

21. The Apparatus as claimed in claim 19 wherein the tunnel client is programmed to configure itself as the tunnel endpoint.

22. The Apparatus as claimed in claim 19 wherein the tunnel client is programmed to maintain the NAT state open by periodically sending keep-alive messages to the tunnel broker server.

23. The Apparatus as claimed in claim 22 wherein the tunnel client encapsulates the keep-alive messages using tunnel setup protocol (TSP) over User Datagram Protocol (UDP) over IPv6 over UDP over IPv4.

24. A system for connecting an IPv6 device in a first IPv6 network through an IPv4 network with network address translation (NAT) to an IPv6 node in a second IPv6 network using a tunnel setup protocol (TSP) session, comprising:

a tunnel client connected to the IPv4 network and the first IPv6 network;

a tunnel broker server connected to the IPv4 network and the second IPv6 network, the tunnel broker server being programmed to respond to a message sent from the tunnel client to establish a control channel between the tunnel client and the tunnel broker server, use the control channel to authenticate the tunnel client attempting to establish an IPv6-in-IPv4 tunnel through the IPv4 network, and accept parameters for a configuration of the IPv6-in-IPv4 tunnel sent by the tunnel client via the control channel;

the tunnel broker server and the tunnel client being respectively programmed to configure a tunnel endpoint for the IPv6-in-IPv4 tunnel, to determine at the tunnel broker server whether network address translation (NAT) occurs between the tunnel client and the tunnel broker server, and when the NAT occurs to set up the tunnel through the NAT using a tunnel setup protocol (TSP) session, between the tunnel client and the tunnel broker server, and subsequently maintaining a NAT state of the NAT open to preserve the IPv6-in-IPv4 tunnel for at least a duration of a communications session between the IPv6 node and the IPv6 device;

the tunnel broker server further programmed to:

receive from the tunnel client, a version of a tunnel session protocol installed at the tunnel client;

determine whether the version of the tunnel session protocol is supported by the tunnel broker server; and when the version of the tunnel session protocol is not supported by the tunnel broker server, returning an error message to the tunnel client.

25. The system as claimed in claim 24 wherein the tunnel client is a host in the IPv4 network.

26. The system as claimed in claim 24 wherein the tunnel client is a router having an IPv4 stack and an IPv6 stack, and at least one link to each of the IPv4 and IPv6 networks.

27. The system as claimed in claim 24 wherein the tunnel broker server is programed to assign an IPv6 prefix to be used by the tunnel endpoint for a duration of the IPv6-in-IPv4 tunnel.

28. The system as claimed in claim 27 wherein the tunnel client is programmed to request the IPv6 prefix from the tunnel broker client.

* * * * *